United States Patent [19]

Harris

[11] 4,281,069

[45] Jul. 28, 1981

[54] PHENOLIC FOAM

[75] Inventor: Thomas G. Harris, Lancaster, Pa.

[73] Assignee: Armstrong World Industries, Inc., Lancaster, Pa.

[21] Appl. No.: 149,766

[22] Filed: May 14, 1980

[51] Int. Cl.³ ............................................. C08J 9/02
[52] U.S. Cl. .................................. 521/123; 521/181; 525/506; 528/129; 528/166
[58] Field of Search ................................ 521/123, 181

[56] References Cited

U.S. PATENT DOCUMENTS

| 3,227,665 | 1/1966 | Fourcode et al. | 521/123 |
| 3,830,894 | 8/1974 | Juenger et al. | 521/181 |
| 3,876,620 | 4/1975 | Moss | 521/181 |

Primary Examiner—Morton Foelak

[57] ABSTRACT

A phenolic foam produced without the use of a conventional chlorofluorocarbon or hydrocarbon blowing agent is disclosed. The phenolic foam is produced as the reaction product of a mixture comprising a phenolic resole, a surfactant and stannous chloride. The phenolic foams can be formulated to contain a substantial proportion of closed cells.

4 Claims, No Drawings

PHENOLIC FOAM

This invention relates to phenolic foams.

More specifically, this invention pertains to phenolic foams produced without the use of a conventional blowing agent. The phenolic foams produced according to this invention can contain a substantial proportion of closed cells.

The production of open-celled phenolic foams using chlorofluorocarbon or hydrocarbon bolwing agents is well known. Also, it is believed that the chlorofluorocarbon blowing agents contribute to the depletion of the ozone in the earth's stratosphere.

The present invention provides a phenolic foam produced without the use of a conventional chlorofluorocarbon or hydrocarbon blowing agent.

According to this invention, there is provided a phenolic foam produced, without the use of a chlorofluorocarbon or hydrocarbon type blowing agent, as the reaction product of a mixture comprising a phenolic resole, a surfactant and stannous chloride.

Any suitable phenolic resole can be employed to produce the phenolic foam of this invention.

A typical phenolic resole for use in this invention is made by the alkaline condensation of phenol with formaldehyde in a 1:1.5 mol ratio, acidification thereafter to a pH of 6.0-6.5, and finally the removal of a portion of the water at reduced pressure to yield a resole containing 14±2% by weight water and having a viscosity of about 2500 cps @ 25° C. (Brookfield Viscometer). The formaldehyde is usually introduced as a 30-40% aqueous solution, the water therewith serving to control the reaction exotherm. The alkaline catalyst is usually sodium hydroxide and is employed in an amount of from about 0.5-3% by weight based upon the weight of the phenol.

Any suitable surfactant can be employed in the production of the phenolic foam of this invention, being employed in an amount within the range of from about 0.5 to about 30 parts per 100 parts by weight of phenolic resole (14±2% water).

Particularly suitable surfactants include ethoxylated castor oil, polyoxyethylene sorbitan monolaurate, polyoxyethylene sorbitan tristearate, etc., and the like.

Stannous chloride, preferably in its dihydrate form, will be employed in an amount within the range of from about 10 to about 26 parts per 100 parts by weight phenolic resole (14±2% water).

Compounds other than stannous chloride which have been tried and found not suitable for use in this invention include stannous oxalate, stannous sulfate, cobaltous chloride hexahydrate, cobaltous sulfate heptahydrate, zinc chloride, zinc sulfate heptahydrate, and aluminum sulfate octadecahydrate.

The phenolic foam of this invention is typically produced by first mixing the phenolic resole and surfactant, followed by introducing the stannous chloride into the resulting mixture with high speed agitation. To produce a foam, the resulting foam composition is placed in an oven and heated in the temperature range of from about 110° to about 150° C.

It has been discovered, as illustrated in the table below, that varying the amount of surfactant employed at a particular phenolic resole to stannous chloride ratio strongly affects both the rise time and the closed cell content of the resulting foam.

The phenolic foam composition of this invention can also include art recognized amounts of conventional ingredients such as accelerators, anti-cracking agents, anti-punking agents, and the like.

Having described the ingredients and methods of this invention, reference is now made to the following examples which further illustrate the practice of this invention.

EXAMPLE I

This example demonstrates the preparation of a phenolic foam of this invention.

200 parts by weight of the phenolic resole described above were heated to 43° C. and blended with 8 parts by weight ethoxylated castor oil in a mixing vessel. The temperature of the resulting blend was 38.9° C.

36 parts by weight of an accelerator, boric anhydride (200 mesh U.S. standard sieve number) were introduced into the contents of the mixing vessel with high speed agitation.

36 parts by weight stannous chloride dihydrate were introduced into the contents of the mixing vessel with high speed agitation.

The resulting phenolic foam composition was placed in an oven and heated at a temperature of 120° C. A peach-colored foam formed in 221 seconds.

The foam was tested and found to have a density of 3.05 pounds per cubic foot and to contain 29.4% closed cells (TM166 Beckman Pycnometer).

EXAMPLE II

This example demonstrates the preparation of phenolic foam of this invention using substantially the procedure of Example I with the exception that boric anhydride was not employed.

The foam formed in 426 seconds, had a density of 2.25 pounds per cubic foot and contained 20.4% closed cells.

The following table illustrates the effect that varying the amount of surfactant would have on the rise time and the closed cell content of seven foams all produced at a phenolic resole (14±2% water) to stannous chloride dihydrate ratio of 5.50 to 1.00.

TABLE

Percentage of Closed Cells In Phenolic Foams Produced At Different Surfactant Levels

| Ethoxylated Castor Oil (parts per 100 by weight weight of phenolic resole) | Rise Time (Seconds) | Density (pcf) | Closed Cell Content (%) |
| --- | --- | --- | --- |
| 0 | 470 | 2.21 | 0.3 |
| 0.72 | 462 | 2.23 | 4.8 |
| 4.27 | 411 | 2.27 | 25.9 |
| 7.81 | 340 | 2.26 | 45.2 |
| 11.36 | 251 | 2.20 | 62.6 |
| 14.91 | 142 | 2.09 | 78.3 |
| 18.45 | 133 | 1.92 | 92.2 |

The above data indicate that increasing the parts by weight surfactant in the phenolic foam composition of this invention would serve to reduce the rise time and increase the closed cell content of the resulting foams.

It will be evident from the foregoing that various modifications can be made to this invention. Such, however, are considered as being within the scope of this invention.

What is claimed is:

1. A phenolic foam produced, without the use of a chlorofluorocarbon or hydrocarbon blowing agent, as the reaction product of a mixture comprising a phenolic resole, a surfactant and stannous chloride.

2. The phenolic foam of claim 1 in which said surfactant is employed in an amount within the range of from about 0.5 to about 30 parts per 100 parts by weight of phenolic resole.

3. The phenolic foam of claim 1 in which stannous chloride is employed in its dihydrate form.

4. The phenolic foam of claim 1 in which said stannous chloride is employed in an amount within the range of from about 10 to about 26 parts per 100 parts by weight of phenolic resole.

* * * * *